Nov. 5, 1963   I. M. DAVIDSON ET AL   3,109,494
AEROFOIL SYSTEMS
Filed April 2, 1962   3 Sheets-Sheet 1

Inventors
Ivor Macaulay Davidson
Ian Clifford Cheeseman

By Stevens, Davis, Miller & Mosher
Attorneys

Inventors
Ivor Macaulay Davidson
Ian Clifford Cheeseman
By
Stevens, Davis, Miller + Mosher
Attorneys Nov. 5, 1963    I. M. DAVIDSON ETAL    3,109,494
AEROFOIL SYSTEMS
Filed April 2, 1962    3 Sheets-Sheet 3

Inventors
Ivor Macaulay Davidson
Ian Clifford Cheeseman
By
Stevens, Davis, Miller + Mosher
Attorneys United States Patent Office 3,109,494
Patented Nov. 5, 1963

3,109,494
AEROFOIL SYSTEMS
Ivor Macaulay Davidson, Farnborough, and Ian Clifford
Cheeseman, Camberley, Surrey, England, assignors to
Power Jets (Research and Development) Limited, London, England, a British company
Filed Apr. 2, 1962, Ser. No. 184,305
Claims priority, application Great Britain Apr. 13, 1961
14 Claims. (Cl. 170—135.4)

The present invention relates to aerofoils, that is, bodies which, when in motion relative to a fluid stream, are subjected to an aerodynamic lift force in a direction transverse to the direction of relative motion. Specifically the invention is concerned with aerofoils of substantially circular cross-section.

A specific application of the invention is to circular section aerofoils constituting the helicopter rotor blades of an aircraft of the "convertiplane" type which in one flight phase, e.g., in cruise, is capable of flight in conventional manner supported by aerodynamic lift on the wings, and in another flight phase, e.g., on take-off and landing, is capable of operation as a helicopter. In this aspect the invention provides a modification of that described in copending patent application No. 77,091 filed December 20, 1960.

In this prior application there is described an aircraft having a helicopter rotor with blades of substantially circular cross-section. Each blade is formed with long shallow apertures which extend along the length of the blade and are arranged to discharge fluid streams as thin layers over the blade surface, these streams having a boundary layer or circulation control effect whereby lift on the blade is induced. The blades described in the prior application have two such apertures, one at the top of the blade and facing rearwardly with respect to the direction of rotation of the rotor, and one spaced rearwardly around the blade circumference by an angle of about 60° and facing downwardly and rearwardly. It is also suggested that additional discharge apertures could be provided.

It would appear that with the arrangement of apertures described in the prior application the drag loss on the blade may be excessive, while the same difficulty would arise in the use of such an arrangement in aerofoils generally.

According to the invention therefore an aerofoil of substantially circular cross-section is formed with at least two spanwise-extending apertures arranged to discharge fluid streams as thin layers upwardly and downwardly towards one another over the rearward part of the aerofoil surface and has means for varying the relative momentum of the two streams.

The opposed streams tend to close up the wake behind the aerofoil, at least to some extent, so that drag is reduced, while the variation of the relative momentum of the two streams gives rise to variation of lift on the aerofoil.

According to a feature of the invention the apertures are so arranged that the streams discharged therefrom meet at a position on the lower rear quadrant of the aerofoil.

In the aircraft described in the prior application, the momentum of the streams is varied by controlling the fluid supply to the apertures. According to a further feature of the present invention however the discharge areas of the apertures themselves are variable relative to one another to give the required variation of momentum and hence of aerofoil lift.

The invention also provides an aerofoil of substantially circular cross-section formed in the upper part of its surface with a plurality of spanwise-extending apertures arranged to discharge fluid streams as thin layers downwardly over the rearward part of the aerofoil surface and in the lower part of its surface with a further aperture arranged to discharge a fluid stream as a layer upwardly over the rearward part of the aerofoil surface and having means for varying the relative momentum of the streams discharged from the further aperture and the downwardly-discharging aperture nearest thereto. The discharge areas of these last-mentioned apertures may be variable relative to one another, while the or each other downwardly-discharging aperture may be of fixed discharge areas.

In a more limited aspect, the invention provides an aircraft having a helicopter rotor, the blades of which are constituted by aerofoils of substantially circular cross-section as aforesaid. The aircraft may further include a control mechanism operable to vary the relative momentum of the streams so that the lift on the blades is varied cyclically in accordance with the rotation of the rotor. Provision may be made for varying the phase relationship between the rotor rotation and blade lift variation, while the control mechanism may also be operable to vary the relative momentum of the streams so that the lift on the rotor blades is varied in unison.

In its application to the aircraft described in the prior application, the invention further provides a fuselage upon which the rotor is mounted and wings capable of supporting the aircraft by aerodynamic lift thereon in forward flight, the rotor blades being capable of being at least partly retracted into the fuselage.

One embodiment of the invention will now be described by way of example with reference to the accompanying diagrammatic drawings of which:

Figure 1:
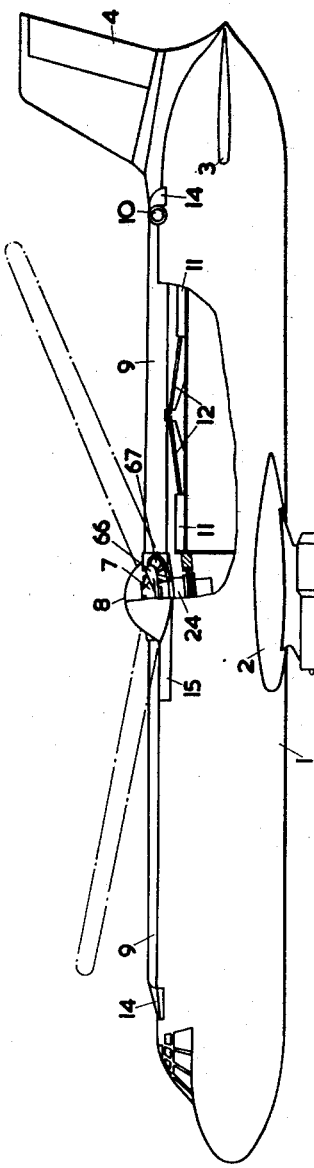
FIGURE 1 is a side view of an aircraft of the "convertiplane" type having a helicopter rotor.

The aircraft is generally similar to one of the embodiments described in the above-mentioned prior application. As shown in FIGURE 1 it comprises a fuselage 1, a pair of wings 2, a tailplane 3 and a fin 4, and it is powered by gas turbine jet propulsion engines of the by-pass type mounted in pods 5 under the wings. On top of the fuselage there is mounted a two-bladed helicopter rotor comprising a rotor head 7 enclosed by a dome 8, a pair of circular section rotor blades 9 and tip jet units 10 mounted at the extremities of blades.

As will be explained in more detail below, the rotor blades 9 are pivotally attached to the rotor head 7, and can be raised and lowered between a retracted or inoperative position (shown in full lines) in which they lie in a plane generally parallel to the longitudinal axis of the aircraft and an extended or operative position (shown in broken lines) by means of two pairs of jacks 11 and linkage 12. In the retracted position, the blades lie and are partly housed within longitudinal recesses in the fuselage upper surface and are retained by means of locks 14. In the operative position the blades are raised clear of the fuselage and are locked at a pre-determined cone angle. It will be noted that the axis of the rotor is inclined to the vertical, so that the blades have to be raised through different angles. Part of the fuselage upper surface around the rotor head is formed by doors 15 or the like which can be retracted or folded back to allow sufficient clearance for the rotor to turn.

Figure 2:
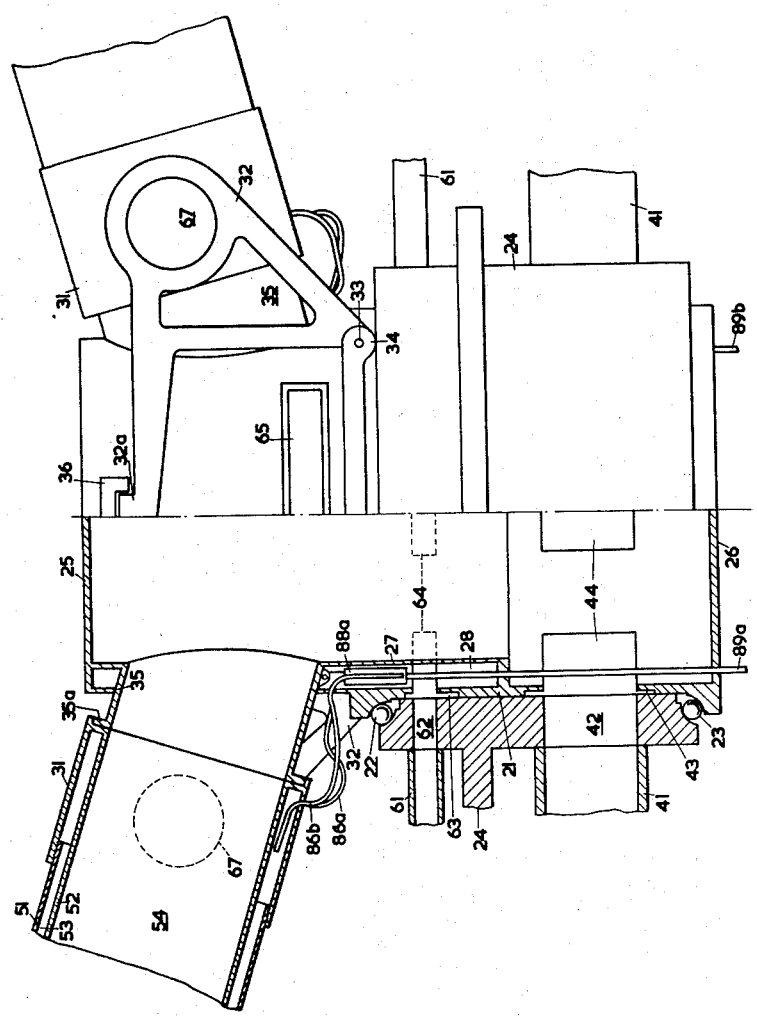
FIGURE 2 is a part-sectional view of the helicopter rotor head.

As in the arrangements of the prior application, the rotor is driven by gas streams diverted from the engine jet pipes. Lift on the rotor blades is induced by the boundary layer or circulation control effect of airstreams discharged as thin layers over the blade surfaces from shallow spanwise-extending apertures or slots, the air for these airstreams being bled from the by-pass compressors of the engines. The construction of the rotor head and the way in which the air for circulation control and the driving gas streams are led to the rotor blades is shown in FIGURE 2.

The rotor head comprises a tubular member 21 rotatably supported by upper and lower bearings 22, 23 in a supporting structure 24 carried in the fixed structure of the fuselage. Diaphragms 25, 26 extend across the top and bottom of the tubular member, and a liner 27 is mounted therein and defines therewith an annular space 28. These parts are, for the sake of simplicity, shown as being of unitary construction but in practice they would be separate components secured together.

Each of the rotor blades 9 has a root 31 rigidly secured to a pair of brackets 32 which are pivotally attached at 33 to lugs 34 formed on the top of the tubular member 21. Each blade can be turned about its pivots 33 by means of the jacks 11 and linkage 12, and when in the raised or operative position as shown, its root end abuts with a flange 35a on the end of a hollow branch duct 35 from the tubular member 21. The blades are retained in the operative position by catches 36 which engage with lugs 32a on the brackets 32.

The driving gas streams diverted from the engines in opposite wings are led through ducts 41 to inlets 42 in opposite sides of the rotor supporting structure 24. These inlets open into an annular gallery 43 surrounding the tubular member 21 and this gallery is in communication with the interior of the tubular member by means of apertures 44.

Figure 3:
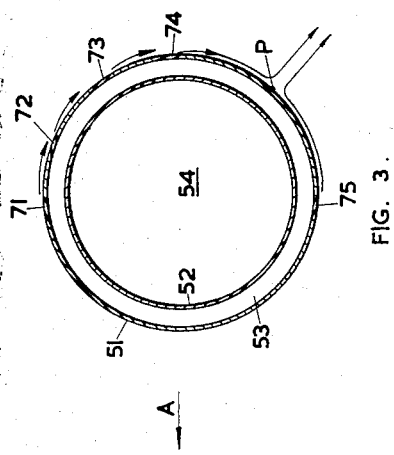
FIGURE 3 is a transverse section through one of the helicopter rotor blades.

Each rotor blade 9 is made up of an outer shell 51 and an inner liner 52 defining between them an annular passage 53 (see also FIGURE 3). When the blade is in the raised or operative position, the duct 54 defined by the liner 52 is in communication through the interior of branch duct 35 with the interior of tubular member 21. Thus the gas streams diverted from the engines and supplied to the interior of the tubular member 21 can be led along the rotor blades to the tip jet units 10 to drive the rotor.

Ducts 61 for the air bled from the engine compressors are connected to inlet apertures 62, one on each side of the supporting structure 24. These apertures open into an annular gallery 63 surrounding the tubular member 21, and this gallery in turn is in communication with the annular space 28 between the tubular member 21 and its liner 27 by means of a ring of holes 64 in the tubular member. The space 28 has a pair of opposite elongated outlet apertures 65 to each of which is connected a horn-like duct 66 (not shown in FIGURE 2 but see FIGURE 1). These ducts extend in opposite senses and carry at their ends slipper pads which bear against corresponding surfaces on the brackets 32 and are formed with outlet orifices which, when the blades are in their raised or operative positions, register with corresponding inlet openings 67 in the abutting surface. The horn-like ducts thus serve to conduct air from the space 28 into the blade roots 31 and thence into the passage 53 between the shell and liner of the blade, one duct supplying each blade.

Reference is now made to FIGURE 3 which shows the disposition of the slots or apertures in the rotor blade. Five such apertures are provided, the first aperture 71 being at or near the top of the blade, the second, third and fourth apertures 72, 73, 74 being spaced rearwardly around the blade circumference at intervals of the order of 20°–30°, say, at about the 30°, 60° and 90° positions as shown or the 25°, 50° and 75° positions respectively. These four apertures are all arranged to discharge thin layers of air from the passage 53 over the rearward part of the blade surface from top to bottom, the aperture 71 being directed rearwardly with respect to the direction of rotation of the rotor (indicated by arrow A), the apertures 72, 73 being directed rearwardly and downwardly and the aperture 74 downwardly. The fifth aperture 75 is located at a position diametrically opposite aperture 71, i.e. at or near the bottom of the blade, and is arranged to discharge rearwardly and upwardly over the blade surface.

For takeoff, the helicopter rotor blades 9 are raised to and locked in their operative position, and the jet engine efflux diverted to supply the tip jet units 10 whereby the rotor is driven. Compressed air is also supplied to the passage 53 in each blade and is discharged over the blade surface as shown in FIGURE 3. The streams from the apertures 71, 72, 73, 74 reinforce one another and the combined streams flow downwardly over the lower rear quadrant of the blade surface in a sense opposed to the upwardly and rearwardly directed stream from the aperture 75. What may be termed the rear stagnation point P is accordingly located where the opposed streams meet at a position on the lower rear quadrant of the blade, and lift on the blade is induced by circulation control so that the aircraft can rise vertically. The opposed streams also tend to close up the wake behind the blade so that drag is reduced.

As forward speed is gained, the weight of the aircraft is transferred to the wings, and the drive to the helicopter rotor discontinued, the jet engine efflux then being discharged rearwardly to propel the aircraft. The rotor is brought to a halt with its blades extending in a fore-and-aft direction, and finally the blades are lowered into the recesses in the top of the fuselage.

For landing a reverse sequence of operation is followed.

The position of the rear stagnation point P and hence the blade lift is determined by the relative momentum of the opposed streams, and so by adjusting their mass flows and/or velocities, the blade lift can be varied. In the present invention this is done by varying the discharge areas of the apertures 74, 75 at the rearward extremity and bottom of the blade, the areas of apertures 71, 72, 73 being fixed. The lift variation is effected by controls equivalent to usual cyclic and collective pitch controls of a helicopter as will now be described with reference to FIGURE 4.

Figure 4:
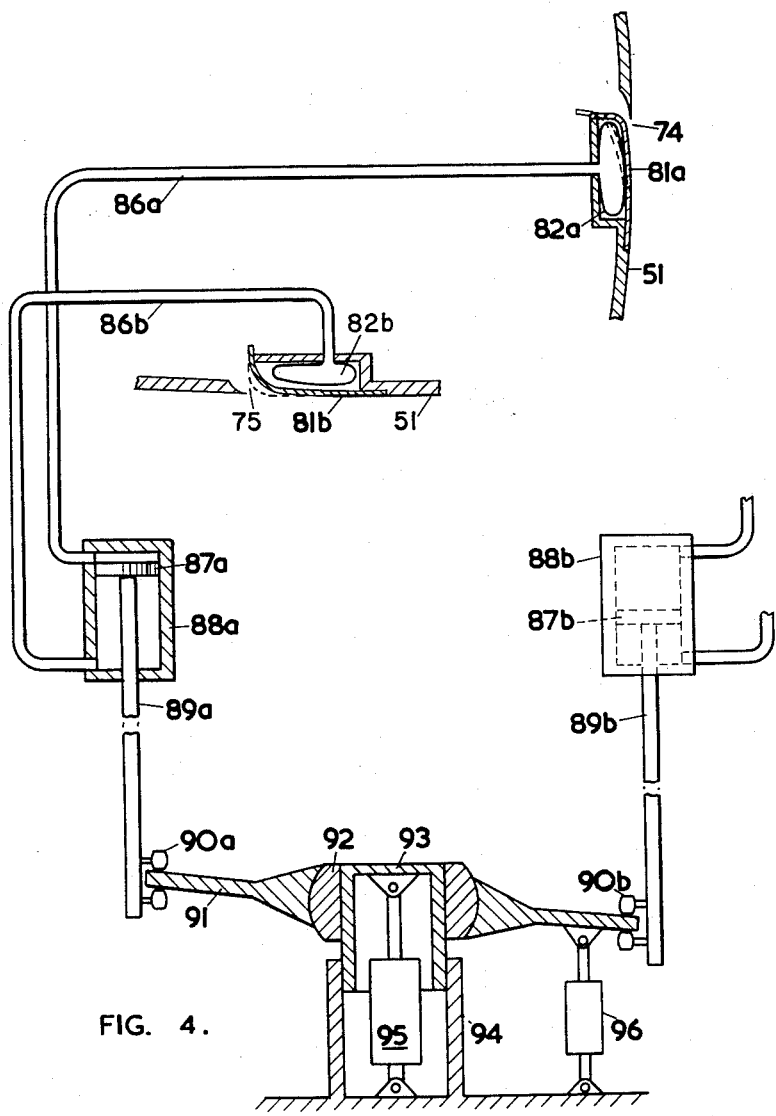
FIGURE 4 is a schematic view of the lift control system for the helicopter rotor.

FIGURE 4 shows fragmentarily the apertures 74, 75 in one of the rotor blades. Each aperture is defined on one side by a flexible strip 81a, 81b, anchored to the blade shell 51 at one end. The strip covers a recess which contains an inflatable bag or bladder 82a, 82b connected by pipes 86a, 86b, to opposite sides of a ram 87a operating in a cylinder 88a, the cylinder, pipes and bladders containing hydraulic fluid. There is a similar cylinder 88b for the other rotor blade, and the two cylinders are mounted as shown in FIGURE 2 at diametrically opposite positions within the annular space 28 so that they are carried round with the rotor. The pipes 86a, 86b include flexible sections extending between and externally of the rotor head and blade to allow for movement of the blade about its pivot. The rams 87a, 87b are mounted on push rods 89a, 89b extending downwardly through the lower closing diaphragm 26 of the rotor head.

The push rods carry at their lower ends rollers 90a, 90b which ride upon a swash plate 91 mounted on a spherical bearing 92 coaxially with the rotor. The bearing 92 is secured to a piston member 93 which can be raised and lowered within a fixed cylinder 94 by operation of a jack 95. The swash plate 91 can be tilted by operation of two further jacks such as 96 set 90° apart.

It will be seen that as the rotor head turns, the rams 87a, 87b are reciprocated and thereby vary the hydraulic pressure applied to the bladders 82a, 82b. In this way the discharge areas of the corresponding apertures 74, 75 in opposite blades are varied cyclically in anti-phase relationship so that the blade lift is cyclically varied. Pitching and rolling control is effected by operating jacks 96 to tilt the swash plate 91 so as to adjust the phase relationship between rotor rotation and discharge area variation. In addition by operation of the jack 95 the swash plate can be raised and lowered bodily so as to vary the discharge areas of corresponding apertures in the two rotor blades in the same sense and so vary the lift on opposite blades in unison.

The mechanism for varying the discharge area of the apertures and for effecting the equivalent of cyclic and collective pitch control may of course take other forms.

It will be seen that in the arrangement described the flow of circulation control air is varied at the point of discharge, and the response should therefore be substantially instantaneous. The necessity for separate supplies to the individual apertures is also avoided, all the apertures being connected to the common passage 53 between the shell 51 and 52 of the blade.

Some variation in the number and arrangement of the apertures in the rotor blades is possible. Thus there might be a greater or lesser number of fixed discharge area apertures in the upper part of the blade. If the last of the upper series of apertures, i.e., aperture 74, is above the rearward extremity of the blade, for example, at about the 60° position, it may be desirable to locate the lower aperture 75 at a position on the lower rear quadrant, e.g. spaced at 20° or 30° from the bottom of the blade. In this case an additional rearwardly facing aperture of fixed discharge area might be provided at the bottom of the blade. Lift variation could be afforded by varying the area of one of the apertures 71, 72, 73 rather than aperture 74, but in any case it should be sufficient to have two variable area apertures, one discharging upwardly and one downwardly. One or both of the apertures 71, 75 might be spaced forwardly by angles of 10–15° from the top and bottom of the blade respectively.

It would be possible to control the lift by valves in the air supply connections to the appropriate apertures; this would require individual supplies to the various apertures as in the prior application aforementioned.

We claim:

1. An aerofoil system comprising an aerofoil body of substantially circular cross-section and formed in its surface with at least two spanwise-extending discharge apertures, means connected to supply fluid to said apertures, said apertures being shaped and arranged to discharge streams of the fluid as thin layers upwardly and downwardly towards one another over the rearward part of the aerofoil body surface, and means for varying the relative momentum of the two streams.

2. A system according to claim 1 wherein said apertures are so disposed and arranged that the streams discharged therefrom meet at a position on the lower rear quadrant of the aerofoil body surface.

3. A system according to claim 2 wherein said apertures are located one substantially at the rearward extremity of the aerofoil body and one substantially at the bottom of the aerofoil body, the apertures being arranged to discharge said streams over the lower rear quadrant of the aerofoil body surface downwardly and upwardly respectively.

4. A system according to claim 3 wherein the aerofoil body is formed with at least one further spanwise-extending aperture in the upper part of its surface, said fluid supply means being connected to supply fluid to said further aperture and said further aperture being shaped and arranged to discharge a stream of the fluid as a thin layer downwardly over the rearward part of the aerofoil body surface.

5. An aerofoil system comprising an aerofoil body of substantially circular cross-section and formed in its surface with at least two spanwise-extending discharge apertures of variable discharge area, means connected to supply fluid to said apertures, said apertures being shaped and arranged to discharge streams of the fluid as thin layers upwardly and downwardly towards one another over the rearward part of the aerofoil body surface, and means for varying the discharge areas of said apertures relative to one another to vary the relative momentum of the two streams.

6. An aerofoil system comprising an aerofoil body of substantially circular cross-section and formed with first and second spanwise-extending discharge apertures of variable discharge area in its surface substantially at the rearward extremity and the bottom of the aerofoil body respectively and with at least one further spanwise-extending discharge aperture of fixed discharge area in the upper part of its surface, means connected to supply fluid to said apertures, said first and second apertures being shaped and arranged to discharge streams of the fluid as thin layers over the lower rear quadrant of the aerofoil body surface downwardly and upwardly respectively and said further aperture being shaped and arranged to discharge a stream of the fluid as a thin layer downwardly over the rearward part of the aerofoil body surface, and means for varying the discharge areas of said first and second apertures relative to one another to vary the relative momentum of the streams discharged therethrough.

7. An aerofoil system comprising an aerofoil body of substantially circular cross-section and formed in the upper part of its surface with a plurality of spanwise-extending discharge apertures and in the lower part of its surface with a further spanwise-extending discharge aperture, means connected to supply fluid to said apertures, said plurality of apertures being shaped and arranged to discharge streams of the fluid as thin layers downwardly over the rearward part of the aerofoil body surface and said further aperture being shaped and arranged to discharge a stream of the fluid as a thin layer upwardly over the rearward part of the aerofoil body surface, and means for varying the relative momentum of the streams discharged from the further aperture and the aperture of said plurality nearest to the further aperture.

8. An aerofoil system according to claim 7 wherein said apertures are so disposed and arranged that the streams discharged therefrom meet at a position on the lower rear quadrant of the aerofoil body surface.

9. An aerofoil system comprising an aerofoil body of substantially circular cross-section and formed in the lower part of its surface with a first spanwise-extending discharge aperture of variable discharge area and in the upper part of its surface with at least two further spanwise-extending discharge apertures, the further aperture nearest the first aperture being of variable discharge area, means connected to supply fluid to said apertures, said first aperture being shaped and arranged to discharge a stream of the fluid as a thin layer upwardly over the rearward part of the aerofoil body surface and said further apertures being shaped and arranged to discharge streams of the fluid as thin layers downwardly over the rearward part of the aerofoil body surface, and means for varying the discharge areas of the variable-area apertures relative to one another to vary the relative momentum of the streams discharged therethrough.

10. A system according to claim 9 wherein the other of said further apertures is of fixed discharge area.

11. An aircraft comprising a helicopter rotor having blades of substantially circular cross-section, each blade being formed in its surface with at least one spanwise-extending discharge aperture of variable discharge area, means connected to supply fluid to said apertures, each said aperture being shaped and arranged to discharge a stream of the fluid as a thin layer over the blade surface in such a direction as to induce lift on the blade, and a control mechanism operable to vary the discharge area of said apertures cyclically in accordance with the rotation of the rotor.

12. An aircraft comprising a helicopter rotor having a pair of opposite blades of substantially circular cross-section, each blade being formed on its surface with at least two spanwise-extending discharge apertures, means connected to supply fluid to said apertures, said apertures being shaped and arranged to discharge streams of the fluid as thin layers upwardly and downwardly towards one another over the rearward part of the blade surface, and a control mechanism operable in accordance with the rotation of the rotor to vary the relative momentum of the two streams discharged from the apertures in one blade cyclically in anti-phase relationship with the relative momentum of the two streams discharged from the apertures in the other blade.

13. An aircraft according to claim 12 wherein said apertures are of variable discharge area and the control mechanism is connected to vary the discharge areas of the apertures in each blade relative to one another.

14. An aircraft comprising a helicopter rotor having a pair of opposite blades of substantially circular cross-section, each blade being formed in its surface with at least two spanwise-extending discharge apertures of variable discharge area, means connected to supply fluid to said apertures, said apertures being shaped and arranged to discharge streams of the fluid as thin layers upwardly and downwardly towards one another over the rearward part of the blade surface, and a control mechanism including a swash plate, two follower members engaging with the swash plate at diametrically opposite positions, means for effecting relative movement of the follower members and the swash plate in accordance with rotation of the rotor and means for tilting the swash plate and for raising and lowering it bodily, one follower member being connected to cyclically vary the discharge areas of the apertures in one blade relative to one another and the other follower member being connected to cyclically vary the discharge areas of the apertures in the other blade relative to one another and in anti-phase relationship with the variation of the areas of the apertures in the opposite blade.

References Cited in the file of this patent

UNITED STATES PATENTS

| | | |
|---|---|---|
| 2,792,189 | Altemus | May 14, 1957 |
| 2,885,160 | Griswold | May 5, 1959 |
| 2,925,129 | Yuan et al. | Feb. 16, 1960 |

FOREIGN PATENTS

| | | |
|---|---|---|
| 222,845 | Great Britain | May 7, 1925 |
| 596,884 | France | Aug. 17, 1925 |
| 597,674 | France | Sept. 7, 1925 |
| 954,413 | France | June 13, 1949 |